United States Patent [19]

Stone et al.

[11] Patent Number: 4,799,981
[45] Date of Patent: Jan. 24, 1989

[54] SPOOL SERVO CONTROL FOR TAPE WEB POSITIONING

[75] Inventors: Kirby L. Stone; R. W. Kneifel, II; John P. Brockman, all of Cincinnati, Ohio

[73] Assignee: Cincinnati Milacron Inc., Cincinnati, Ohio

[21] Appl. No.: 168,361

[22] Filed: Mar. 15, 1988

[51] Int. Cl.⁴ .............................. G05B 19/10
[52] U.S. Cl. .................... 156/64; 156/361; 156/523; 156/541; 156/574; 318/567
[58] Field of Search ........... 156/523, 574, 577, 522, 156/361–363, 350, 542, 541, 540, 64; 318/567, 568

[56] References Cited

U.S. PATENT DOCUMENTS

| | | | |
|---|---|---|---|
| 4,557,783 | 12/1985 | Grone et al. | 156/257 |
| 4,591,402 | 5/1986 | Evans et al. | 156/574 |
| 4,696,707 | 9/1987 | Lewis et al. | 156/64 |
| 4,699,683 | 10/1987 | McCowin | 156/574 X |
| 4,719,397 | 1/1988 | Kneifel, II et al. | 318/567 |
| 4,750,965 | 6/1988 | Pippel et al. | 156/574 X |

OTHER PUBLICATIONS

"Dynamics of Web Tension Control with Velocity or Torque Control", John J. Shelton.

*Primary Examiner*—David Simmons
*Attorney, Agent, or Firm*—Wood, Herron & Evans

[57] ABSTRACT

Servo spool control for tape web positioning is disclosed wherein the position of the web between two spools may be accurately known and controlled and the tension on the web maintained. To accomplish such control, the motors driving the respective spools are driven by dynamic torque signals in response to change in position commands from a computer controller wherein the dynamic torque signals are correlated to the inertial torque and frictional torque of the spools and their drives.

28 Claims, 8 Drawing Sheets

SPOOL SERVO CONTROL FOR TAPE WEB POSITIONING

BACKGROUND OF THE INVENTION

I. Field of the Invention

This invention relates to servo control of a pair of rotatably driven spools for positioning a tape web between the spools. More particularly, the present invention relates to such servo control for winding and unwinding the web from the spools to accurately apply strips or courses of tape carried by the web to a contoured surface.

II. Description of the Prior Art

By way of background, a computerized tape-laying machine may include a tap dispensing apparatus which is positionable and movable under computer control relative to a layup tool or the like to which multiple strips or courses of composite tape material are to be applied to form parts such as aircraft wings, for example. A length of composite tape adhered to a tape backing web (also referred to as a substrate or backup paper) is dispensed by a tape applicator head including a pair of spools. Tape is generally supplied from one of the spools referred to as a feed reel and the web is generally collected on the other spool referred to as a takeup reel. Intermediate the spools is a tape application member or shoe across which the web is to pass on its traverse between the spools and whereat tape is to be peeled from the web and adhered to the layup tool. In cooperation with movement of various machine members, the tape dispensing shoe of the tape applicator head is movable in a plurality of rectilinear and/or rotational axes under control of a computer program by which to apply several plies of tape to the layup tool placed between the pylons.

For example, the tape applicator head is movable vertically upwardly and downwardly relative the layup tool by a Z-axis servo control under program control of a computer. Also, the tape applicator head is movable horizontally relative the layup tool in an X-axis (by movement, for example, of a gantry) and in a Y-axis (by movement, for example, of a carriage) all under program control. The X-, Y-, and Z-axes are orthogonal. The tape applicator head is further movable under program control rotationally and along an arc over the layup tool, for example, along C- and A-axes, respectively. The C-axis is parallel to the Z-axis. The A-axis is perpendicular to the Z-axis. Finally, the web itself is movable between the spools and over the tape dispensing shoe along a U-axis.

Movement of the web in the U-axis has typically been accomplished by frictional engagement of the tape with the layup tool. This may be referred to as "torque mode." In the torque mode, counterrotating forces are applied to the spools. As is conventional, each spool is coupled to the rotatable shaft of a servo motor or drive. As is also conventional, commands from a computer control or the like to a servo control will cause the servo control to generate appropriate voltage signals to effectuate rotation of the servo motors. In the aforesaid torque mode, each spool is to be rotated by its associated servo motor in a direction which would wind up the web onto the spool. However, because each spool is attempting to wind up the web, the web is placed under tension between each spool and the shoe. Importantly, the web is also kept under tension as it passes by tape cutters situated between the shoe and feed reel whereby to cut the tape (but not the web) to the desired lengths and along the appropriate angle across the width of the tape to define the header and tail ends of the tape strips.

As is well understood, the torque mode of control is open loop such that voltage signals from the servo control to the spool motors are not varied depending upon performance of the servo motors. The specific voltage signals are correlated to the desired tension at the spools as determined by an operator. For this reason, the voltage signals utilized in the torque mode may be seen to comprise "static torque" signals.

To apply tape, the shoe is moved towards the layup tool until it compacts the tape against the layup tool (on-plane). Typically, tape is applied in strips or courses beginning at a header and ending at a tail of the strip. At the beginning of the application of each strip, the forward edge of the header may be situated below the shoe and upon movement of the tape head, frictional forces would tend to peel the header from the web and adhere it to the layup tool. The frictional forces also tend to move the web in the U-axis. The slackening or tightening of the web at the respective spool caused by movement of the web is reacted to as a consequence of the static torque signal to the servo motors to maintain web tension. Thus, the takeup servo motor will cause spent web to be wound onto the takeup spool rather than accumulate between the shoe and takeup reel. Similarly, tightening of the web between the shoe and feed reel will tend to overcome the torque at the feed reel causing fresh web to be unwound from the feed reel. Reverse movement of the tape head would cause the reverse to occur (i.e., wind up on the feed reel and unwinding from the takeup reel).

The head continues to move while on-plane until the end or tail of the strip is placed. In some situations, as the tail of the strip is approached, the shoe may be lifted away from the layup tool causing the web to back off from the layup tool as well. A compaction roller may be positioned between the web and tape to cause the tail of the tape to come away from the web and adhere to the layup tool. When the web is spaced away from the layup tool, such as when the shoe is lifted from the layup tool (offplane), there would be no movement of the web in the U-axis as the tension on the web to either side of the shoe would tend to equalize. However, when a compaction roller is used, there may be a need to continue movement of the web across the shoe such as to payoff the remaining tail of the current strip. To obtain such web movement, the machine may include a "position mode" of control in which the takeup reel is provided not only a static torque signal but is further caused to rotate under program control with a variable change in position signal as is conventionally employed to effectuate movement of the other machine axes, i.e., the change in position signals effect driving movement of the web in the U-axis when off-plane. The feed reel, however, continues to operate in the torque mode whereby the torque applied to the feed reel will cause the web to wind or unwind therefrom under tension depending upon direction of rotation of the takeup reel. As is well understood, unlike application of static torque signals, which is an open loop form of control, position mode control is closed loop.

The position mode has also been utilized to reposition the web after tail application. As mentioned, the web may need to be moved across the shoe to payoff the tail of the current strip. However, the beginning or header of the next or adjacent strip of tape should not at this time be removed from the web. When the tail is placed, therefore, part of the header of the next strip may have already passed the shoe on its way to the takeup reel. The position mode may be utilized to reposition the web so that the header of the next strip is under the shoe for subsequent application.

In the position mode of control, the static torque signals to the takeup reel are augmented or replaced with velocity command signals. As is well known, the computer calculates the distance S the tape is to be moved and, based upon predetermined feed rates, determines how far the tape should move over a predetermined time or interpolation interval. The servo control generates a voltage signal corresponding to the desired velocity of the tape web, which velocity is correlated to the change in position commands from the computer.

Also, as is conventional, a roller resolver riding on the web wound onto the takeup reel generates a resolver signal which is utilized to measure longitudinal movement of the web. Coupled between the motor and the servo control is a drive amplifier to supply motor drive currents in response to the voltage signal from the servo control. The motor may also provide a tachometer signal for use by the drive amplifier in a velocity feedback loop as is conventional.

As mentioned, position control is closed loop. Thus, the servo control generates the velocity command signal based upon a following error signal which is typically the difference between the actual extent of tape travel and the desired extent of travel thereof (as calculated using the change in position command signal from the computer). The velocity command signals are then converted in the servo control to voltage signals and coupled through the drive amplifier to the motor to cause rotation of the takeup reel, at a velocity correlated to the following error by a gain factor signal. The gain factor signal is typically selected so that the voltage signal corresponding to the driving command signal will result in movement of the tape at a predetermined velocity correlated to a predetermined following error signal, e.g., 1 inch/min for one-thousandth inch following error signal (1 inch/min per 1/1000 FE).

In summary, "torque-mode" of operation of the U-axis is open loop by coupling static torque signals to the motors driving the spools whereby to maintain the tape web under tension throughout its entire traverse from spool to spool. Thus, with the shoe on-plane, only the frictional forces between the tape and layup tool are relied upon to peel the tape from the web and adhere it to the layup tool as the tape applicator head traverses the layup tool. In the position mode, such as may be utilized to reposition the web after a tail has been applied by compaction rollers, the takeup reel drive is additionally or alternatively responsive to closed loop velocity command signals.

The above operation, however, is not believed to provide sufficiently accurate web placement or positioning information in all cases. For example, stretch of the web cannot be accurately controlled or predicted, thus introducing error into the calculations of the velocity command signals. Similarly, eccentricities of the web on the takeup reel introduce further error.

Additionally, operation as above described is believed to allow for end placement errors of the beginning (header) and end (tail) of any given strip of tape. By way of example, the frontal edge of the header may not be perpendicular the U-axis (i.e., the tape longitudinal axis) but may be angled relative thereto. In that case, the forwardly edge of the header may be a very small widthwise portion of the strip of tape. The shoe will thus initially be overlying only a small portion of the header and as the tape applicator head begins to move in order to apply the tape, the tape may slide somewhat across the layup tool rather than just simply payoff the web. The sliding in some cases may be as much as one-half inch. In this situation, the header of the tape will actually be applied to the layup tool at a position other than desired leading to misapplication of the tape. While use of position mode control has been attempted for laying the header, it is believed that slippage has not been sufficiently reduced. Thus, further improvements in position mode control of the tape web are desired.

SUMMARY OF THE INVENTION

The present invention is believed to provide a method and apparatus for tape web positioning under control of the computer controller such that the position of the web may be accurately known and controlled and the tension on the web maintained. In its broadest sense, the invention provides such a method and apparatus by driving the spool servo motors with dynamic torque signals. The dynamic torque signal for the primary spool is correlated to: (a) inertial torque of the primary spool and drive, and (b) frictional torque of the primary spool and drive. The dynamic torque signal for the other or secondary spool is correlated to: (a) inertial torque of the secondary spool and drive; (b) frictional torque of the secondary spool and drive; and (c) frictional torque resulting from the web moving over the face of the tape application shoe.

In a preferred embodiment, the actual position of the web is to be measured by a pinch roll resolver placed downstream of the feed reel but upstream of the shoe. With such a resolver, the tape-laden web passes between a pair of closely spaced rollers which provide signals accurately reflecting the longitudinal extent of travel of web therethrough. Pinch roll resolver measurement avoids the eccentricity errors of the prior art roller resolver. Further, placement of the resolver midstream of the web where tape is still adhered thereto virtually eliminates stretch-induced errors, i.e., between the shoe and feed reel. This, however, separates the resolver some distance from the drive being controlled responsive to that resolver allowing for the possibility of failing to measure web motion resulting from slackness of the web between the primary spool and the resolver. The control provided by the present invention is believed to advantageously avoid slackening or overtightening of the web between the resolver and the spool which might otherwise result in loss of control leading to misapplication of tape and/or damage to the machine. In a preferred embodiment, the distance from resolver to drive is minimized by selecting the feed reel as the primary spool, rather than the takeup reel as was conventional. In so doing, the ability of the present invention to provide desired position control is enhanced as position is measured by the pinch roll resolver located between the feed reel and the application shoe.

While position mode control requires a further signal correlated to a following error signal (difference between actual and desired moves) for the primary spool, the present invention is believed to provide better position mode control by utilizing a modified relationship between actual and desired moves to determine the following error signal. In particular, when the shoe is on-plane, only proportional gain factors are to be utilized throughout the servo loop thus giving the U-axis a spring-like effect. This will accommodate positioning errors between the web positioning system and the applicator head positioning system, whereby positioning control of the web is not lost. Additionally, the present invention utilizes the velocity feed forward signal to maintain the position loop following error nominally null. Also, to match movement of the tape along the U-axis to the movement of the tape head in the X, Y, Z and other axes, the present invention includes provision for introducing lag into the U-axis positioning so that the desired position lags the actual position to the same degree as occurs in the other servo controlled axes to thereby coordinate the axes. Specifically, in the present invention, axis coordination is accomplished by accumulating the change in position commands and then low pass filtering them to provide a filtered desired position signal for determination of the following error.

With the shoe on-plane, the primary spool is to be responsive to a primary driving command signal correlated (1) proportionally to the following error, (2) to the velocity feed forward signal, and (3) to a dynamic torque signal which is correlated to: (a) the inertial torque of the primary spool and drive, and (b) frictional torque of the primary spool and drive. Preferably, the primary driving command signal also includes (4) a static torque signal component which is correlated to the tension of the web on the supply side of the tape application shoe. Further, where the web is not to move (i.e., the change in position signal is zero), the primary driving command signal is preferably comprised of only the dynamic and/or static torque signals.

With the shoe off-plane, the primary driving command signal to the primary spool is preferably correlated (1) proportionally and integrally to the following error, (2) to the velocity feed forward signal, and (3) to a dynamic torque signal which is correlated to: (a) the inertial torque of the primary spool and drive, and (b) frictional torque of the primary spool and drive. The primary driving command signal further preferably includes (4) a static torque component correlated to the tension of the web on the supply side of the tape application shoe.

In either the on-plane or off-plane situation, the other or secondary spool is preferably responsive to a secondary driving command signal having a dynamic torque signal component correlated to: (a) inertial torque of the secondary spool and drive; (b) frictional torque of the secondary spool and drive; and (c) friction of the web passing over the tape application shoe. The secondary driving command signal also has a static torque component correlated to the tension of the web on the supply side of the application shoe.

By virtue of the foregoing, it is believed that improved servo control of the spools between which the web traverses will be accomplished whereby accurate position control and proper tension is attained both on-plane and off-plane. Thus, for example, when on-plane, tape will move in the U-axis in a manner corresponding to the movement of the tape head. As a result, it is believed that the header of the tape will adhere to the layup tool with no more than acceptable slippage (i.e., 0.030 inch) at the desired location. Similarly, appropriate tension will be maintained on the web so that all movements of the web are monitored without either web slack or overtightening of the web. Finally, the position of the web may be accurately known at all times whether on-plane or off-plane and desired movement of the web thus obtained in response to commands from the computer controller.

These and other objects and advantages of the present invention shall be made apparent from the accompanying drawings and the description thereof.

BRIEF DESCRIPTION OF THE DRAWINGS

The accompanying drawings, which are incorporated in and constitute a part of this specification, illustrate a preferred embodiment of the invention and, together with a general description of the invention given above, and the detailed description of the preferred embodiment given below, serve to explain the principles of the invention.

DESCRIPTION OF THE PREFERRED EMBODIMENT

To illustrate the present invention, a program controlled tape-laying machine shall be descibed in detail. The machine 10 to be described herein is preferably a "CTL Multi-Axis CNC Fiber Placement Machine" and is available from Cincinnati Milacron Inc., the assignee of the present invention. One embodiment thereof is described in a brochure of the same title, Publication No. SP-152-2, Copyright 1986. Publication No. SP-152-2 is incorporated herein by reference. Control 120 to be described herein is preferably an ACRAMATIC 975 CNC also available from Cincinnati Milacron as described in "Feature Descriptions for the Cincinnati Milacron Acramatic 975C", Publication No. CTL-452, revised Jan. 28, 1986. Publication No. CTL-452 is incorporated herein by reference.

Figure 1:
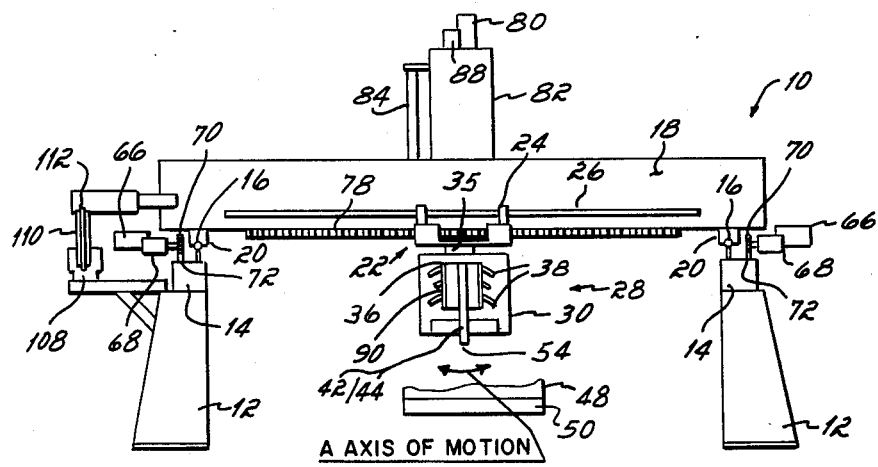
FIG. 1 is an end view of a tape-laying machine to which the present invention is applicable.
Figure 2:
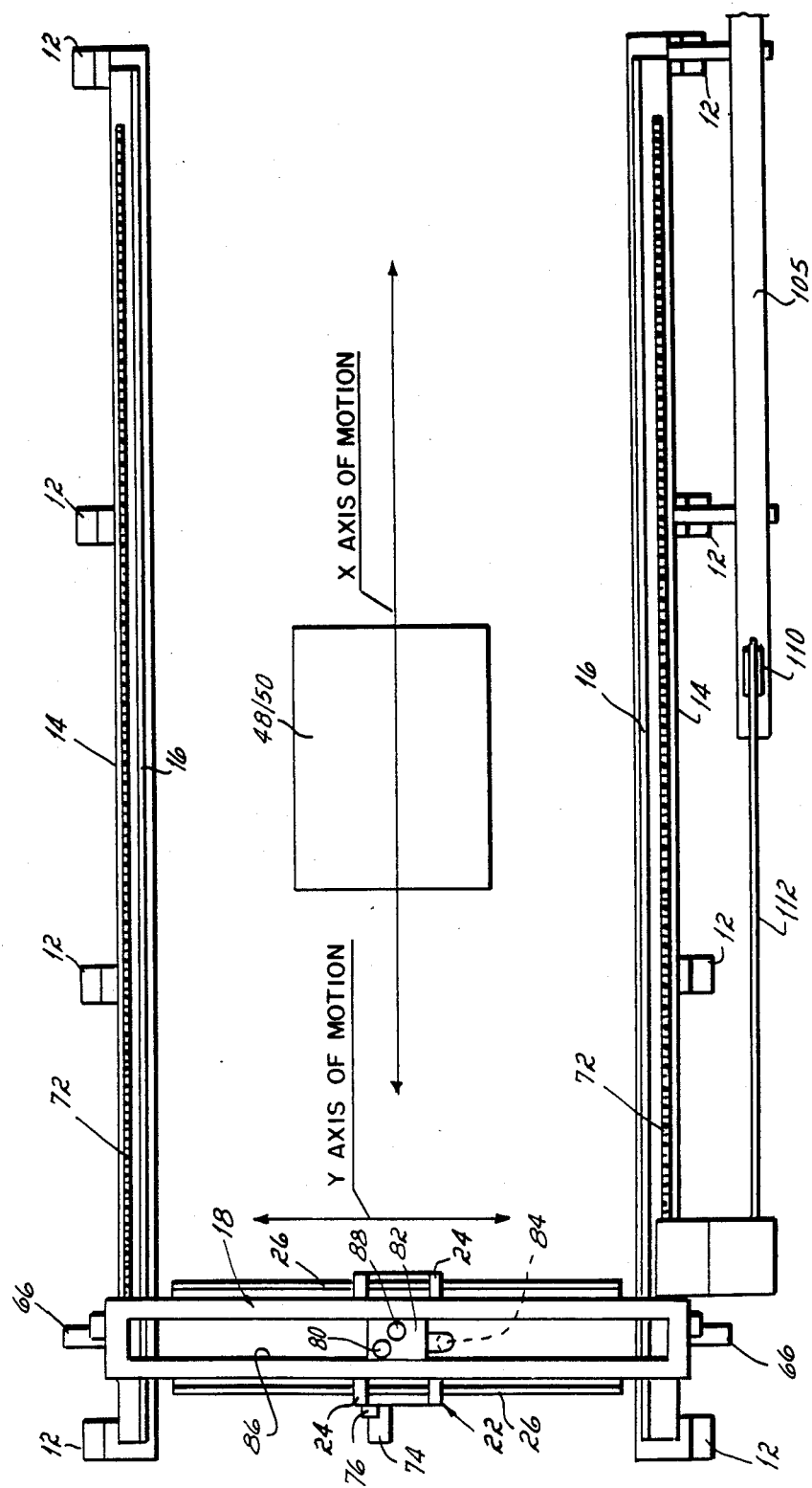
FIG. 2 is a top view of the machine of FIG. 1.

The machine shall be described with reference to FIGS. 1 and 2. Tape laying machine 10 includes a plurality of vertical support stands or pylons 12 which fixedly support a pair of horizontal side members 14 to define a machine frame. Fixedly secured to each side member 14 is a cylindrical way 16. A slotted, horizontal gantry or member 18 is supported on side members 14 by slides 20 slidably supported on cylindrical ways 16. Gantry 18 comprises a large rectangular cross-section member to which slides 20 are rigidly affixed. Horizontal motion of gantry 18 relative to vertical support stands 12 defines the X-axis of motion of machine 10.

A carriage 22 is movably supported upon gantry 18. To this end, carriage 22 includes slides 24 which are slidably supported upon cylindrical ways 26. Ways 26 are fixedly attached to gantry 18. Horizontal motion of carriage 22 relative to gantry frame 18 along ways 26 is defined as the Y-axis of motion.

Figure 3:
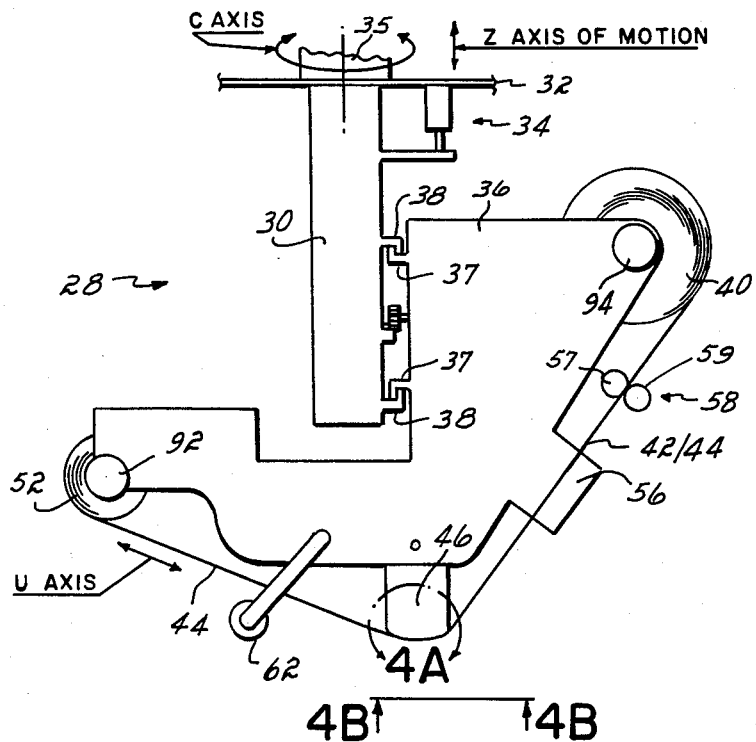
FIG. 3 is a schematic side view of the tape applicator head of the machine shown in FIG. 1 for purposes of explaining the principles of the present invention.

Carriage 22 provides support for a tape applicator head 28 or the like (FIG. 3). Head 28 includes a rigid vertical guide or backing plate 30 which is movably supported to carriage 22 for movement of tape head 28 in a plurality of axes. Plate 30 is pneumatically suspended from upper, horizontal plate 32 by fluid actuators (schematically represented at 34). Upper plate 32 is in turn rotatably coupled to column 35 which is carried by carriage 22. Vertical movement of head 28 is accomplished by movement of column 35 upwardly or downwardly and is defined as the Z-axis of motion of machine 10; rotational movement of head 28 is accomplished by rotation of upper plate 32 relative column 35 and is defined as the C-axis of motion. Head 28 further includes a moveable frame 36 to which are mounted slides 37 coupled for arcuate movement along ways 38 mounted on plate 30. Arcuate or angular movement of frame 36 is defined as the A-axis of motion (FIG. 1). Further detail of the A and Z-axis motion and control is provided in U.S. Pat. No. 4,719,397, assigned to the assignee herein, the disclosure of which is incorporated herein by reference.

Figure 4A:
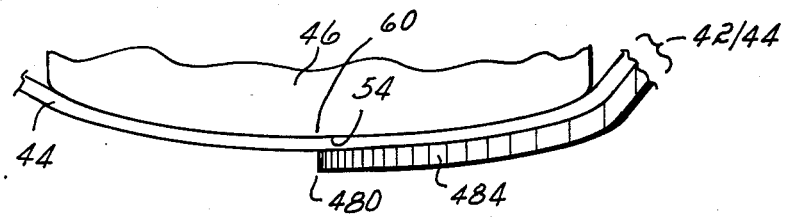
FIG. 4A is an enlarged view of the area encircled within arrow 4A of FIG. 3 showing the web positioned over the face of the tape applicator shoe.
Figure 4B:
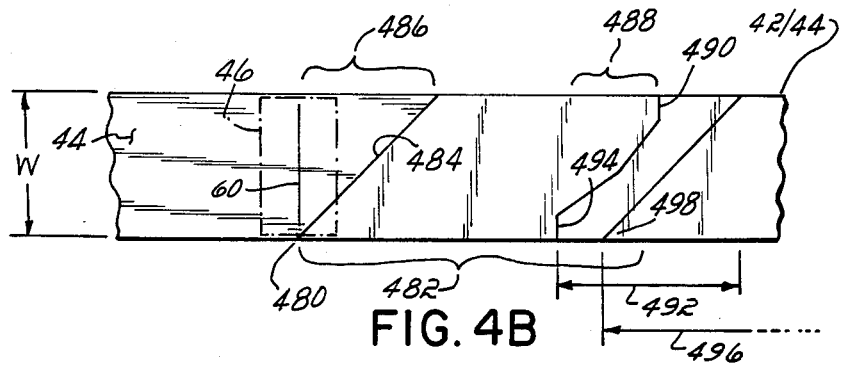
FIG. 4B is a bottom view taken along lines 4B—4B of FIG. 3.

Rotatably supported on frame 36 is a feed reel or spool 40 on which is wound composite tape material 42 secured to a carrier or backing web 44 (FIGS. 4A and 4B). Web 44 passes over a presser member or tape dispensing shoe 46 (shown diagrammatically in FIG. 3) whereat tape 42 is to be applied to a layup tool 48 on mold 50. As tape material 42 is applied to layup tool 48, it peels away from backing web 44 whereafter web 44 is taken up by takeup reel or spool 52 also rotatably supported on frame 36. Shoe 46 is situated below the axes of rotation of spools 40, 52 so that tension on web 44 will pull the web against the face 54 of shoe 46. Midstream of shoe 46 and spool 40 are tape cutters 56 and pinch roll position sensor or resolver 58 the purpose of which will be explained hereinafter.

To obtain proper application of tape 42 to tool 48 it is important that web 44 be maintained in tension from spool 40 to spool 52 and between the spools and shoe 46. Proper tensioning also assures accurate position control for tape laying as well as tape dimension by coordinated control of the cutters for length of tape and angle of tape headers and tails.

Specification of coordinates of the X, Y, Z, C, and A axes defines a location of presser member or tape dispensing shoe 46 associated with tape head 28. The position of shoe 46 as defined by the above coordinates defines a reference tape dispensing or application line 60 wherein the tape is to contact the surface of layup tool 48. Shoe 46 is preferably pivotally connected to frame 36 to permit a compaction roller 62 to swing into its place between web 44 and tape 42 to complete placement of a tail, for example. Tape head 28 may be like that shown in U.S. Pat. No. 4,557,783, entitled "Composite Tape Laying Machine and Method", assigned to the assignee hereof, the disclosure of which is incorporated herein by reference.

Movement of the various members in their respective axes will now be explained. Gantry 18 is propelled bidirectionally in the X-axis by a pair of drive motors 66 fixedly mounted to the distal supported ends of gantry 18. Coupled to each motor 66 is a transmission 68 which includes the necessary gearing (not shown) and an extending driver gear or pinion 70. Extending pinions 70 mesh with racks 72 which are fixedly mounted to and adjacent side members 14. As is well understood, velocity command signals will be utilized to drive motors 66 thereby causing pinions 70 to rotate and, in cooperation with racks 72, each end of gantry 18 to move.

To provide positional information of gantry 18, motors 66 incorporate position transducers or resolvers (not shown) whereby movement of gantry 18 is translated to feedback signals for utilization in control of motors 66. Each of motors 66 may be independently controlled by respective servo controls which are preferably responsive to a single X-axis change in position command signal (although separate such command signals could be employed).

With respect to the Y-axis, motion of carriage 22 relative to gantry 18 is effected by drive motor 74 which, through transmission 76, imparts rotation to a pinion (not shown) which rotatably meshes with rack 78 rigidly affixed to gantry 18 to cause movement of carriage 22. The position of carriage 22 in the Y-axis is measured by a position transducer or resolver (not shown).coupled to motor 74.

Motion of tape head 28 in the Z-axis is accomplished by a nut (not shown) through which is threadably received a threaded rod (not shown). The nut is held to column 35 so that vertical motion of the nut translates to vertical motion of column 35 whereby plate 30 coupled thereto also moves vertically. The threaded rod is threadably received in the nut and is caused to rotate by drive motor 80 via a related transmission (not shown), both of which are affixed to the top of upper housing 82 which is itself coupled to carriage 22 for movement therewith. As the threaded rod rotates, the nut will ride up and down thereon causing head 28 (supported on plate 30) to move upwardly and downwardly in the Z-axis. Coupled to motor 80 is also a position transducer or resolver (not shown) by which the position of head 28 in the Z-axis may be monitored. In addition to drive motor 80, pneumatic counter balance 84 is provided to equalize the load presented to drive motor 80 between the up and down directions. Preferably the threaded rod and nut (both not shown) comprise a ball screw arrangement.

Rotation of head 28 in the C direction is effected by rotation of plate 32 by a drive (not shown) which extends through lengthwise slot 86 in gantry 18 and within column 35. Such rotation is imparted by drive motor 88. Sensing of motion (or angle) is similarly accomplished with a resolver (not shown) coupled to motor 88. Finally, angulation of head 28 in the A direction is effected by a drive motor (not shown) affixed to frame 36. A pinion 89 coupled to the A-axis motor (not shown) meshes with arcuate rack 90 affixed to plate 30 to cause movement of frame 36 in the A-axis. Arcuate ways 38 cooperate with slides 37 secured to frame 36 to maintain angulation in a desired path. Positional (angular) information in the A-axis may also be monitored by a resolver (not shown) coupled to the A-axis drive motor.

Preferably, each drive motor includes a conventional velocity feedback loop comprising a drive amplifier and tachometer (not shown). As is conventional, the output of the tachometer (not shown) is fed back to a related drive amplifier (not shown) for a velocity feedback loop. The drive amplifier further preferably includes a gain adjustment (not shown) to manually set the gain thereof so that a predetermined voltage signal from a related servo control will cause movement of the member in the desired axis at a predetermined velocity as will be explained. The drive amplifier further preferably includes a balance adjust (not shown) by which to manually set the bias therein so that a signal of zero volts from the related servo control will result in a velocity of zero of the member in the related axis.

Control of tape web position in the U-axis is provided by drive motors 92 and 94 associated with takeup spool 52 and feed reel 40, respectively. As represented schematically in FIG. 5, associated with drive motor 92 is tachometer 96 which is utilized in conjunction with position measured by pinch roll resolver 58 to calculate the radius of the web (working radius) on spool 52. Also associated with motor 92 is drive amplifier 98 to convert voltage signals from servo control 126 to current signals for motor 92 as is well understood. Similarly, associated with drive motor 94 is tachometer 100 and drive amplifier 102 which, in position mode, provide a traditional velocity feedback loop. In the torque mode (not shown) tachometer 100 is disconnected from drive amplifier 102 to eliminate the velocity feedback loop. Drive motor 94 further has associated with it a resolver 104 geared to motor 94 which measures angular position of feed reel 40. Signals from resolver 104 are utilized in conjunction with position measured by resolver 58 to compute the radius of the web (working radius) on spool 40.

Machine 10 further preferably includes a tray 108 attached to selected ones of support stands 12 and in which wheeled wire guide 110 rides. Wire guide 110 provides a convenient mechanism to avoid tangling the wires 112 coupled between the various motors and resolvers and the like of machine 10 and computer or control 120 which will now be illustrated with reference to the block diagram of FIG. 5.

Control 120 directs motion of the members of machine 10. Control 120 is a digital microprocessor based computer system. Hence, in the preferred embodiment, the change in position signals, following error signals, torque signals and gain factor signals, for example, are implemented as digital words. Control 120 includes a plurality of independent modules including main supervisor (or block processor) 122, servo supervisor 124, servo modules 126, 128, and 130 (servo I/O's) each of which may be coupled to one or more drivers and resolvers, device input/output module 132, and data input/output module 134 all connected by a common bus 136. Each of these modules typically includes a microprocessor and associated peripheral devices and memory as required for the function of the module. Applicants have chosen to implement these modules using the 80186 microprocessor and peripheral devices available from Intel Corporation. Control 120 also includes a main memory 138 in which is stored the application program(s) defining desired movement of the members to construct a component such as an aircraft wing, for example, on layup tool 48 positioned between pylons 12.

The overall cycle of operation of machine 10 is defined by an application program stored in memory 138 and executed by main supervisor 122. The application program stored within memory 138 may be produced on independent equipment and loaded through the data input/output module 134 from a bulk data transceiver 140. A pendant 142 is coupled to bus 136 by device I/O 132 by which to manually control movement of the members of machine 10.

During execution of the application program, microprocessor unit 144 of main supervisor 122 executes the selected programs stored in memory 138 until the end of the program has been reached, i.e., all the moves of tape head 28 have been completed. To effect movement of the machine members for each move of tape head 28, main supervisor 122 generates span and control signals (see FIG. 6A) which are utilized by servo supervisor 124 to repetitively generate change in position command signals by which to control operation of the servo control modules 126, 128, and 130 as will be explained. Servo supervisor 124 includes a local microprocessor 146 executing servo processing programs (see FIG. 6B) stored within local memory 148 and an interrupt control 150 responsive to interrupts from a master servo I/O (one of the servo I/O's, e.g., servo I/O 126 is selected as the master servo I/O). In response to an interrupt from servo I/O 126, preferably every 5 milliseconds, change in position command signals are determined by servo supervisor 124 and distributed to the appropriate servo mechanism input/output interface. Each of the servo mechanism input/output interface modules provides the necessary interface circuitry for connection to at least one drive motor and its associated resolver.

Further details of the servo mechanism interface modules are illustrated by the servo control module 126 which preferably controls the U-axis feed reel and takeup reel in accordance with the present invention. Hence module 126 is, for explanation purposes, shown coupled to drivers 92, 94, resolvers 58, 104, tachometer 96 and drive amplifiers 98 and 102. While not shown, module 126 may also control motion of head 28 in another axis or axes. Each of servo I/O's 128 and 130 may similarly be coupled to a plurality of drivers and resolvers (only one shown for each in FIG. 5) to thus control motion of head 28 in several other axes, including the X, Y, Z, A, C and related axes.

Connection between module 126 and common bus 136 is achieved through dual port memory device 152. Data to be exchanged between module 126 and other modules within the system is transferred asynchronously through dual port memory device 152. Local processor 154 executes servo input/output programs 156 (FIGS. 7A-7C and 8) stored within local memory 158.

Local processor 154 receives position feedback signals from pinch roll resolver 58 through resolver interface circuitry 162. Pinch roll resolver 58 preferably includes a pair of spaced apart rollers 57, 59 through which the tape-laden web 42/44 passes. Rollers 57, 59 are closely spaced such that any movement of web 42/44 therebetween results in position feedback signals to resolver interface 162. As discussed below, the position feedback signals from resolver 58, for example, are to be compared to filtered command position signals (FCP) calculated using change in position command signals received from servo supervisor 124 to generate a following error signal (FE). In the positioning mode, processor 154 modifies the following error signal with a dynamic torque signal and velocity feed forward signal as will be explained to produce feed reel or primary driving command signals (PCMD) which are converted to voltage signals in driver interface 164. Resolver 104 driven by motor 94 for spool 40 provides signals through interface 160 by which the angular position of spool 40 is determined.

Takeup spool 52 is driven by motor 92 which is responsive to takeup or secondary driving command signals (SCMD) from driver interface 166 which command signals at least include dynamic torque signals as will be explained. Interfaces 164 and 166 include digital-to-analog converters (not shown) which convert the digital driving command signals to voltage signals which are input to amplifiers 102 and 98 to drive motors 94 and 92, respectively.

Figure 6A:
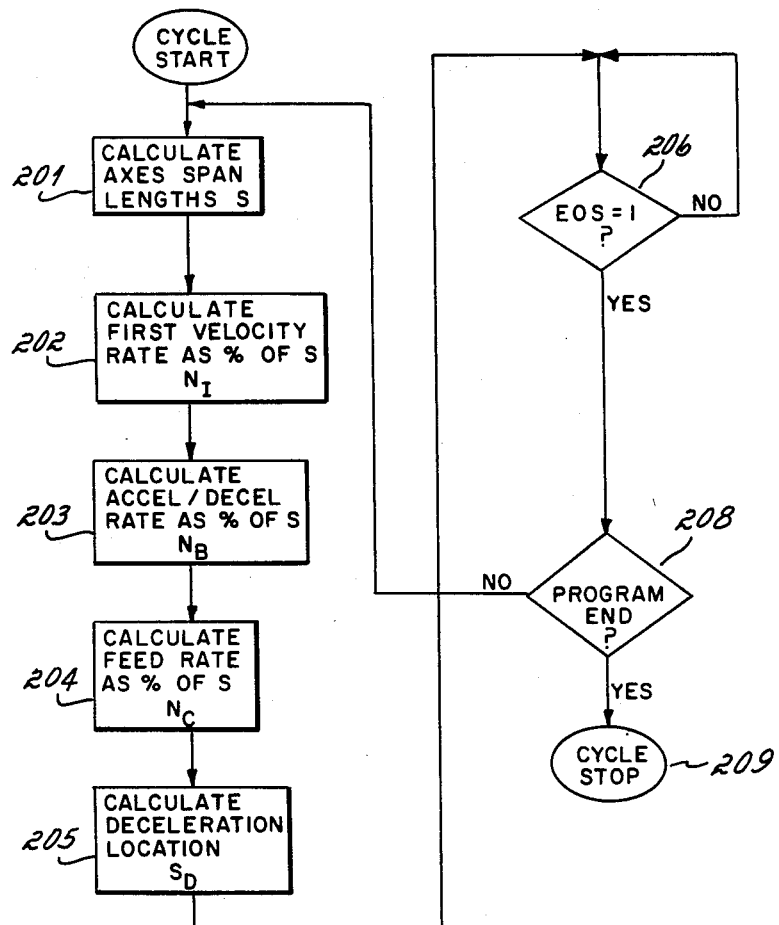
FIGS. 6A and 6B are simplified flow charts of the control procedures effected by the control of FIG. 5.
Figure 6B:
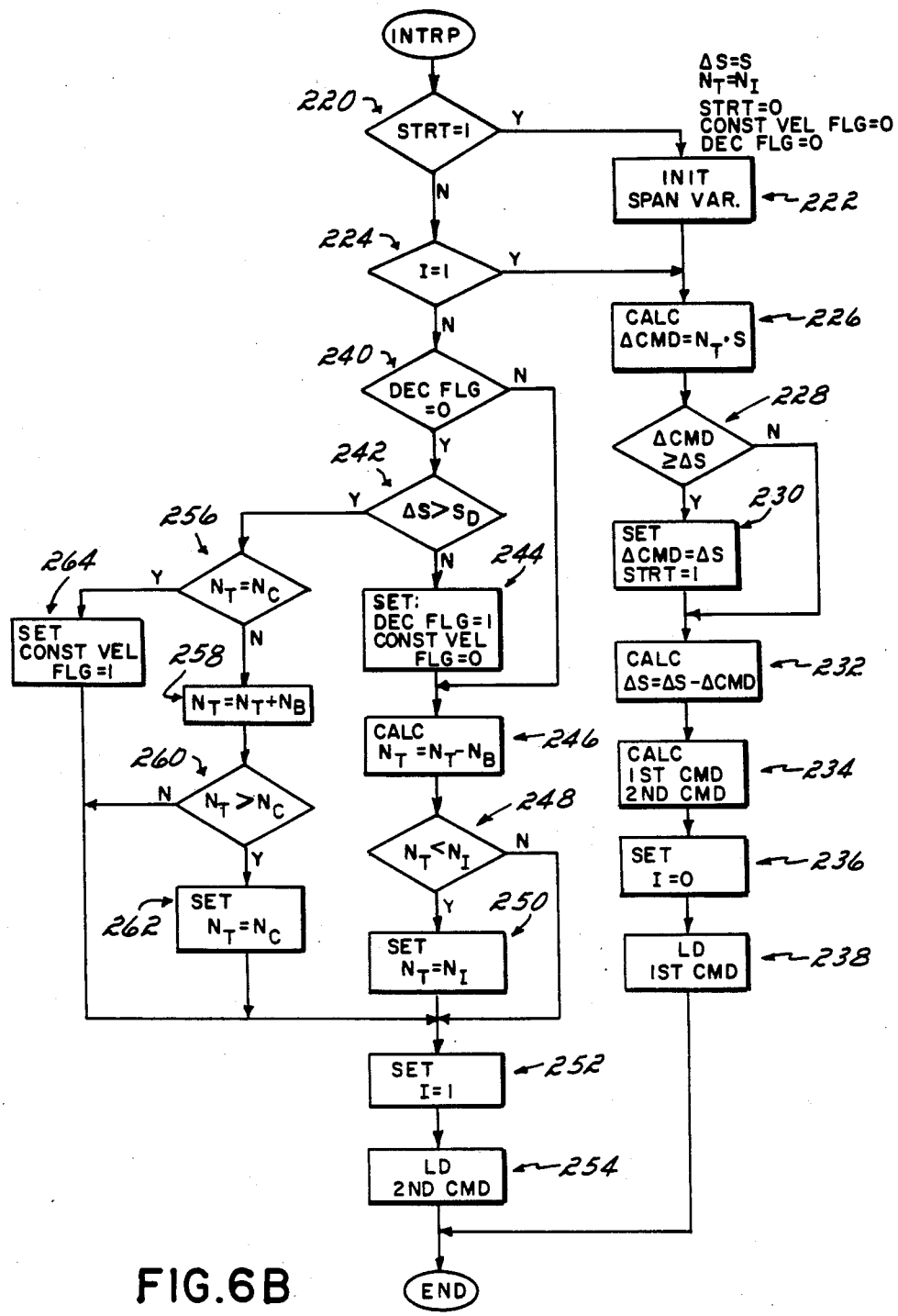

The control procedures for effecting machine motion during operation of the application program stored in emory 138 shall be described with reference to the flow charts. The flow chart of FIG. 6A illustrates the processing steps executed by the main supervisor 122 to produce span and control signals in accordance with the application program defining locations and functions stored in memory 138. The flow chart of FIG. 6B illustrates the processing steps executed by servo supervisor 124 to generate change in position command signals from the span and control signals produced by main supervisor 122. Change in position command signals are derived by the sequences of FIGS. 6A and 6B separately for each axis. These signals are utilized by the U-axis only in positioning mode, while they are utilized at all times by the remaining axes.

Figure 5:
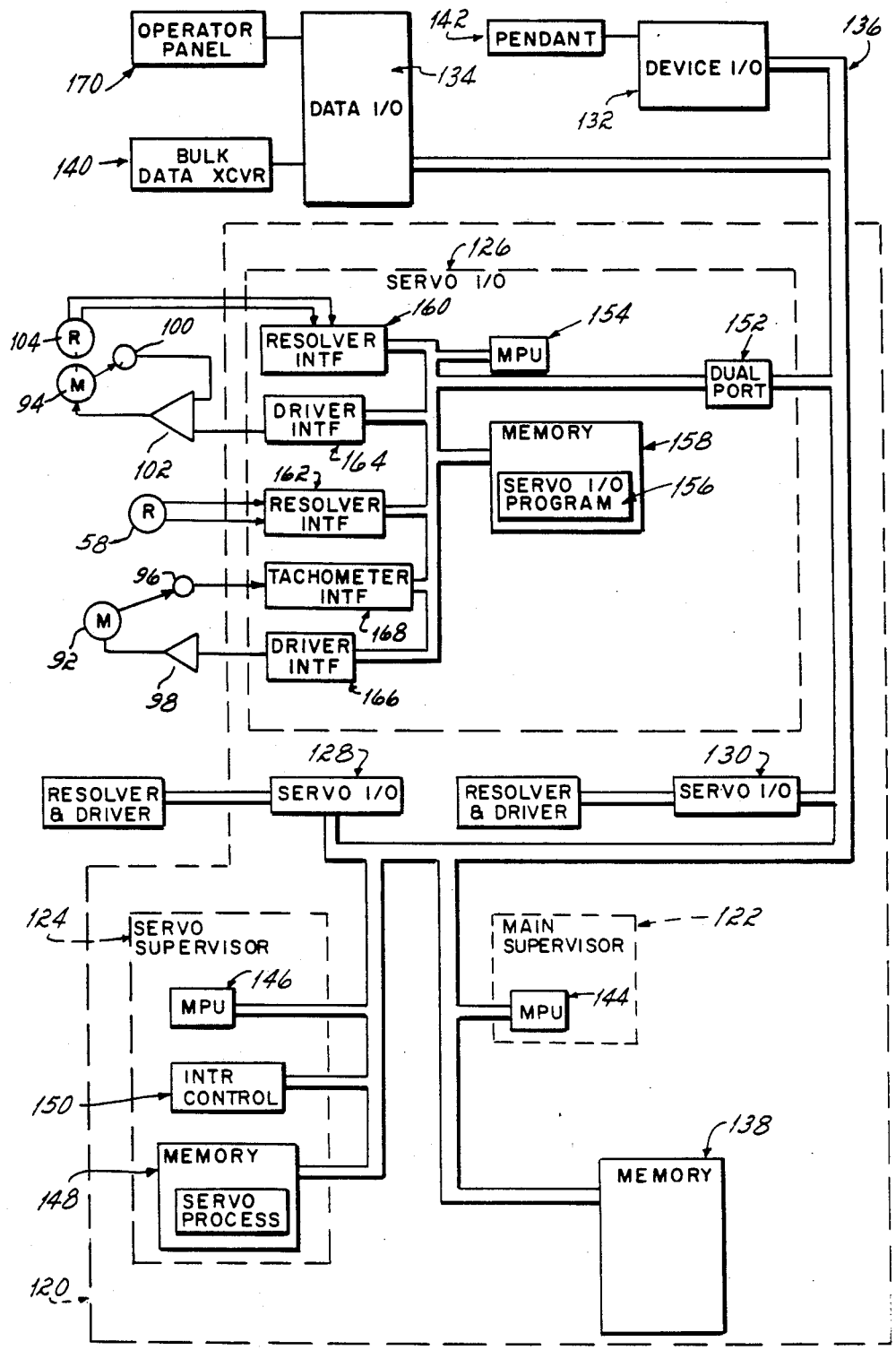
FIG. 5 is a block diagram of the control for the machine shown in FIGS. 1 and 2.

Processing of the procedural steps of the flow chart of FIG. 6A is initiated by a cycle start signal produced in response to the operation of a cycle start push button (not shown) on operator panel 170 (FIG. 5). At process step 201 data are computed which are required for the interpolation of intermediate points along a linear path, for example, between two successive programmed locations of shoe 46 (i.e., tape application or dispensing line 60). The span length S in each axis is determined from the coordinate data of these locations. A pre-programmed velocity or feed rate is recalled from memory 138 and, in conjunction with the span length signal S for each axis, additional velocity control signals are calculated at process steps 202–205 as follows:

$N_I$=the percent of S which the member is to move in the selected axis during the first and last interpolation intervals defining a step velocity change;

$N_B$=the percent of S by which the interpolation incremental distance is to change;

$N_C$=the percent of S which the member is to move during each interpolation interval in the constant velocity mode; and $S_D$=the distance from the end of the span at which deceleration must begin from the programmed velocity.

These values for S, $N_I$, $N_B$, $N_C$ and $S_D$ are stored in a buffer in memory 138 for access by the servo supervisor 124 during the servo supervisor's execution of the span.

After process steps 201–205 have been executed, the overall cycle of operation executed by the main supervisor is controlled by the completion of motion as indicated by the end of span signal detected at decision step 206. If the servo supervisor has not set the end of span flag, herein referred to as EOS, the sequence may idle at process step 206 until the end of the span is reached (EOS=1). Preferably, the sequence of steps 201 to 205 will be executed for the next span before the end of the previous span is reached in an effort to pre-process information to generate the next set of span and control signals which may then be loaded into a buffer.

Following completion of interpolation, a decision is made at process step 208 to determine whether or not the location defining the end of the current span corresponds to the end of the program stored in memory 138. If not, execution of the control procedure of FIG. 6A continues to process step 201 to initialize data for the next programmed span. Execution of the stored program of motion continues in this fashion until it is determined at decision step 208 that the last location of the program has been reached. Thereafter, the tape laying program execution ceases, but the entire program may be re-executed by operator intervention.

Axis command signal processing of servo supervisor 124 shall be described with reference to FIG. 6B. Periodically, in response to an interrupt signal generated by master servo I/O 126, a span increment procedure is executed to output servo commands to the servo I/O modules 126, 128, 130.

At decision step 220 it is determined whether the current execution of the span increment interpolation procedure is the first execution for the current span. If it is, span variables are initialized at process step 222 in preparation for interpolation of the first increment of the current span. The span length remaining $\Delta S$ is initialized to the axis span length S; the current value of the increment factor $N_T$ is initialized to the step velocity factor $N_1$; the first execution flag STRT is initialized to 0; the constant velocity flag is initialized to 0 and the deceleration flag is initialized to 0. If the current execution of the span increment interpolation procedure is not the first for the span, process step 222 is skipped. At decision step 224 it is determined whether the iteration toggle I is set to 1 indicating a first iteration for an interpolated change in commanded position $\Delta CMD$. Each change in commanded position $\Delta CMD$ is processed in two iterations, and each iteration outputs half of the total change in commanded position to the appropriate servo I/O. The interpolation procedure maintains a record of progress in the current span as the magnitude of the span length remaining $\Delta S$. This magnitude is reduced once for each pair of iterations.

At process step 226, the magnitude of the change of commanded position ($\Delta CMD$) for the next pair of iterations is calculated as the product of the axis span length S and current value of the increment factor $N_T$. During the first iteration of the first execution of the procedure, the increment factor $N_T$ has a value equal to the step velocity factor $N_I$ calculated by the pre-interpolation procedure at process step 202. The magnitude of the change in commanded position $\Delta CMD$ is compared to the current magnitude of the remaining span length $\Delta S$ at decision step 228. If the change in commanded position $\Delta CMD$ is greater than or equal to the remaining span length $\Delta S$, the change in commanded position $\Delta CMD$ is set equal to the remaining span length $\Delta S$ at process step 230. Since this condition corresponds to interpolation of the last span increment of the current span, the first flag is set true and the end of span flag EOS is set true (=1). Process step 230 is skipped if the change in commanded position $\Delta CMD$ is less than the remaining span length $\Delta S$.

At process step 232, a new value for the remaining span length $\Delta S$ is calculated by subtracting the magnitude of the change in commanded position $\Delta CMD$ from the previous value of the remaining span length $\Delta S$. At process step 234, the first and second iteration change in position commands 1st CMD and 2nd CMD are calculated. These commands are referred to here as #CMD (wherein # refers to 1st or 2nd as appropriate). 1st CMD is calculated by dividing ΔCMD by 2, and 2nd CMD is equal to the difference of ΔCMD and 1st CMD. This calculation self corrects for round-off errors in the division of ΔCMD. At process step 236, the iteration toggle is set to 0 in preparation for the next iteration. At process step 238, the first iteration change in position command (1st CMD) is loaded into the appropriate servo I/O module.

The second iteration change in position command (2nd CMD) generation begins with determination of a 0 value of I detected at decision step 224. On the occurrence of the next interrupt, after the first iteration, the value of the iteration toggle flag I will be 0 and the execution of the interpolation procedure will continue at decision step 240. There, it is determined whether the deceleration flag has been set true, indicating that interpolation has progressed to the deceleration point $S_D$ or beyond. If not, execution continues at decision step 242 where it is determined whether the remaining span length ΔS is more than the deceleration distance $S_D$ calculated in the preinterpolation procedure at process step 205. If the remaining span length ΔS is not more than the deceleration distance $S_D$, execution continues at process step 244 where the deceleration flag is set true and the constant velocity flag is set false. Thereafter, a new value for the increment factor $N_T$ is calculated at process step 246 to decrease the magnitude of the increment factor $N_T$ by the acceleration/deceleration incremental adjustment $N_B$. At decision step 248 it is determined whether the new value of the increment factor $N_T$ is less than the step velocity factor $N_I$. If it is, the interpolation factor $N_T$ is set equal to the step velocity factor $N_I$ at process step 250. Otherwise, process step 250 is skipped. Thereafter, at process step 252, the iteration toggle flag I is set equal to 1 in preparation for the next iteration. At process step 254, the second iteration change in position command 2nd CMD is loaded into the appropriate servo I/O module. It will be appreciated that the new value of the increment factor $N_T$ will result in the interpolation of a smaller increment command ΔCMD with the next execution of the increment interpolation procedure, thus effecting a decrease of the velocity of the affected machine member.

If interpolation had not progressed to the deceleration point, execution from decision step 242 would proceed to decision step 256 where it is determined whether the current value of the increment factor $N_T$ is equal to the constant velocity factor $N_C$ calculated during execution of the pre-interpolation procedure at process step 204. If the result of this test is negative, it is known that interpolation is in the acceleration phase. Execution continues at process step 258 where the magnitude of the increment factor $N_T$ is increased by the acceleration/deceleration factor $N_B$. At decision step 260, the new value of the increment factor $N_T$ is compared to the constant velocity factor $N_C$ calculated during execution of the pre-interpolation procedure at process step 204. If the increment factor $N_T$ is greater than the constant velocity factor $N_C$, it is set equal to the constant velocity factor $N_C$ at process step 262. Otherwise, process step 262 is skipped.

If at decision step 256 the interpolation factor $N_T$ is equal to the constant velocity factor $N_C$, no modification is required until interpolation progresses to the deceleration point $S_D$ and interpolation continues at constant velocity. Execution from decision step 256 proceeds to process step 264 where the constant velocity flag is set and therefrom to process step 252.

While the foregoing has been described with respect to change in position signals as if for only one axis, the sequence occurs concurrently for each axis including the U-axis. Hence, the various servo I/O's will receive respective interpolation change in position signals or commands (#CMD) for the appropriate axes almost simultaneously whereupon movement in all axes will be coordinated. That is, movement in each axis will accelerate to a constant velocity so that the respective constant velocity or feed rate is attained for each axis at the same time. Deceleration is to likewise occur simultaneously. Main supervisor 122 thus calculates the various values of span and control signals S, $N_I$, $N_B$, $N_C$, and $S_D$ for each axis accordingly.

Additionally, the span length S (or, alternatively, angle of rotation in the A-axis, for example) may be positive or negative indicating forward or reverse motion of the member or the web in its respective axis. As a consequence, the iteration change in position signals (#CMD) will also be either positive or negative to indicate the direction of movement.

U-axis control is operative in selectable program and torque modes of control. Selection is effected by codes contained within the application program executed by the overall procedure of FIG. 6A. Under program mode, web positioning is subject to closed position mode loop control shown and described with reference to FIGS. 7A-7C. Under torque mode, web positioning is effected with open loop torque mode control shown and described with reference to FIG. 8.

Figure 7A:
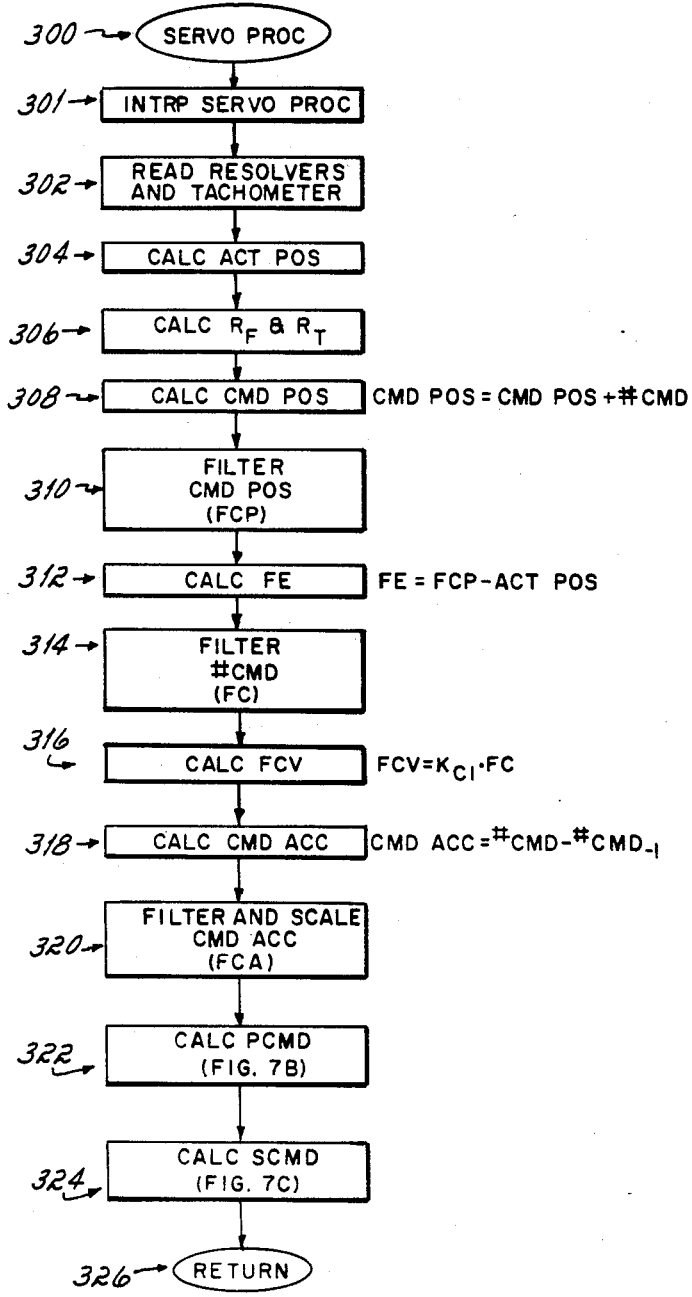
FIGS. 7A, 7B and 7C are flow charts of the procedure for position mode control of the spools of the tape applicator head of FIG. 3 to position a web according to the present invention.
Figure 7B:
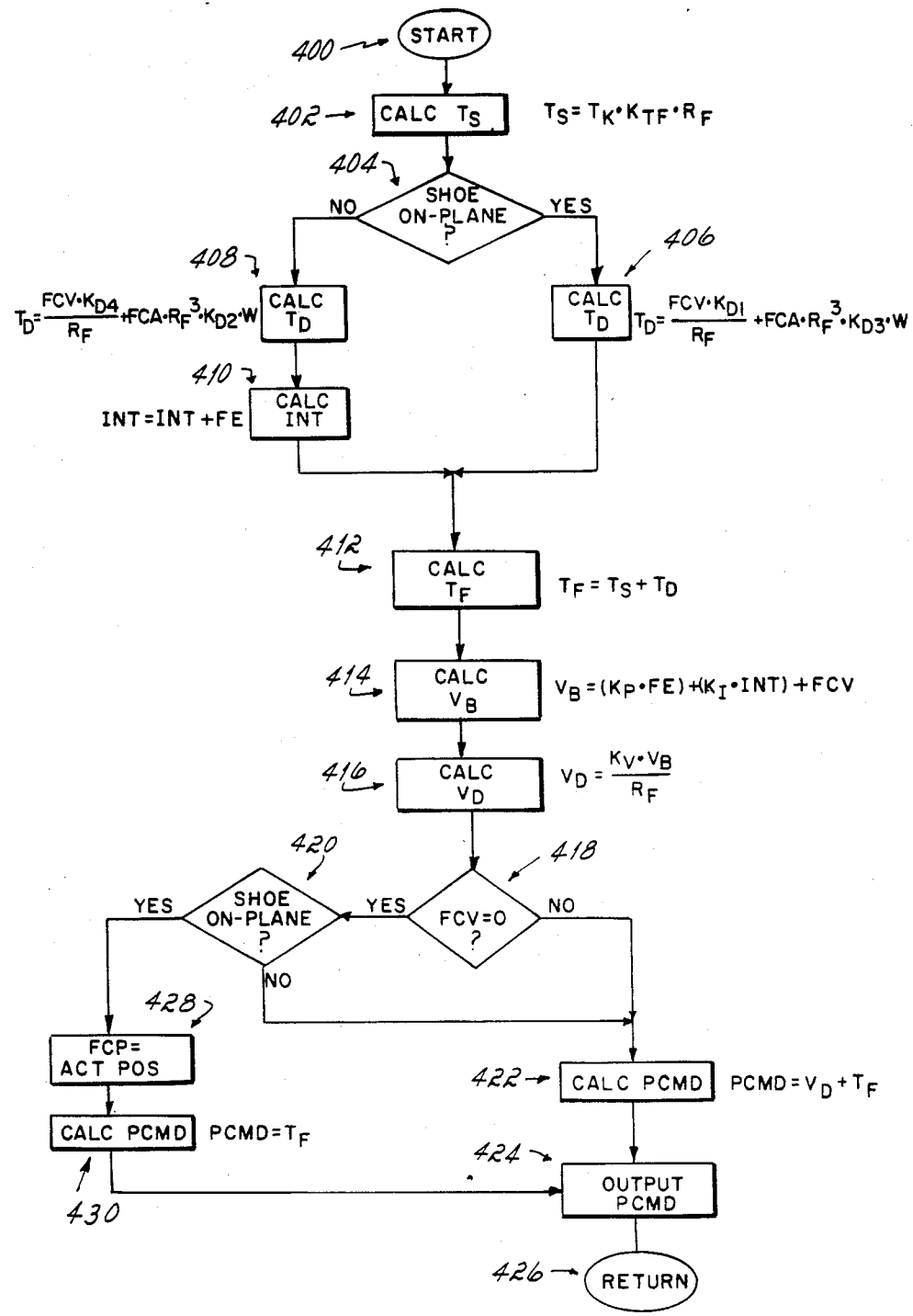
Figures 7C, 8:
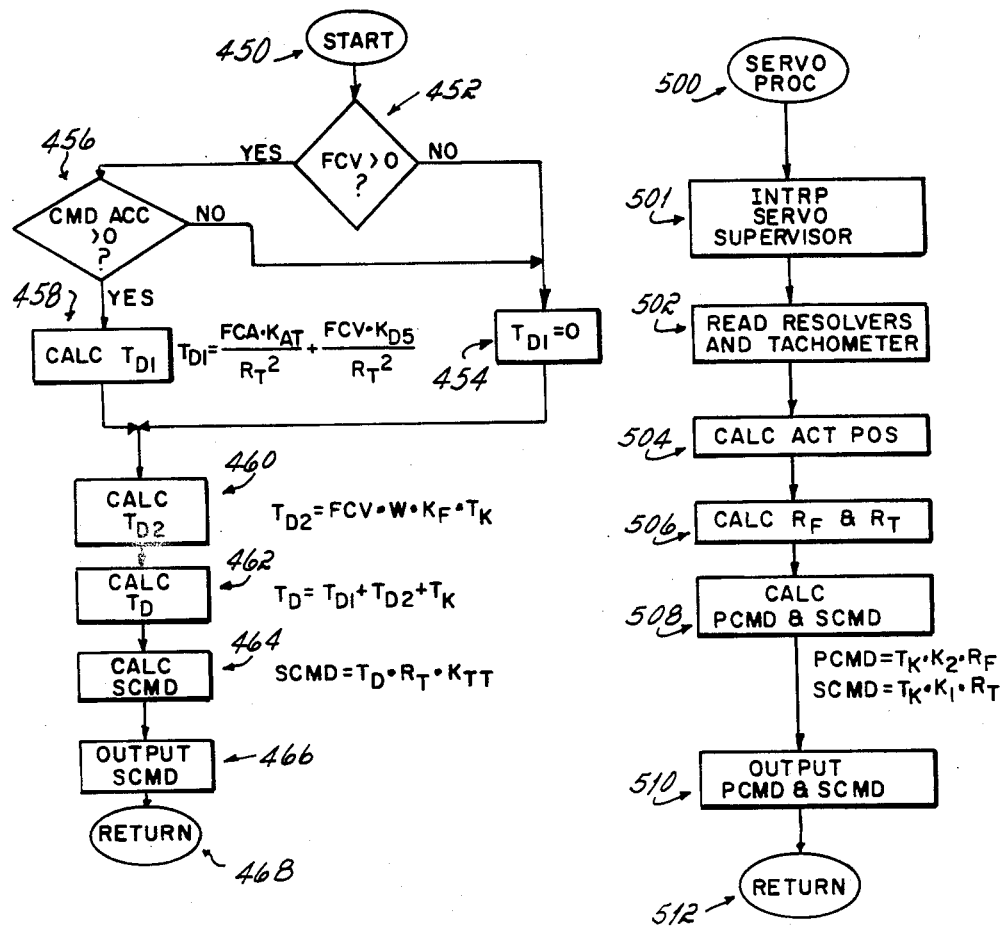
FIG. 8 is a flow chart of the procedure for torque mode control of the spools.

With specific reference to tape web or U-axis position control, the control procedure of the present invention shall be described with reference to the flow charts of FIGS. 7A-7C. The sequence of FIG. 7A performs certain of the steps necessary for generation of either PCMD or SCMD in accordance with the sequence of FIGS. 7B and 7C for the feed reel and takeup reel, respectively. The sequence of FIGS. 7A-7C are initiated every 5 milliseconds (step 300) and begin with issuance of an interrupt (step 301) to the servo supervisor 124. At process steps 302 and 304, resolver and tachometer data from feed reel resolver 104, pinch roll resolver 58 and tachometer 96 are read by interfaces 160, 162 and 168, respectively, and microprocessor unit 154 calculates the actual position (ACT POS) of the web at shoe 46 (i.e., the linear or longitudinal length of tape that has passed through pinch roll resolver 58). At step 306, the radius of the web on each of the feed reel and the takeup reel (working radii) are calculated as necessary. For the feed reel, after approximately every 3 inches of travel of web 44 as indicated by pinch roll resolver 58, the radius of the web thereon in 0.001 inch units ($R_F$) is recalculated as follows:

$$R_F = \frac{\text{(linear tape distance)}}{\text{(angular feed reel distance)}}$$

wherein linear tape distance data is obtained from pinch roll resolver 58 and angular feed reel distance data is provided by resolver 104 at feed reel 40.

For the takeup reel, the working radius ($R_T$) is recalculated at approximately one half second intervals when the spool has been rotating at 10 RPM or more during that one-half second interval. The calculation is as follows:

$$R_T = \frac{\text{(linear tape distance)}}{\text{(average motor speed)}}$$

The linear tape distance data is again obtained from pinch roll resolver 58 but includes only the length of tape moved during the one-half second interval. The average motor speed is calculated as the average speed of driver motor 92 during that one-half second interval based upon signals from tachometer 96.

At step 308, a new command position (CMD POS) is calculated by summing the iteration change in position command (#CMD) with the previous value of command position CMD POS, i.e., the change in position signals are accumulated. At process step 310 the accumulated command position signal is prefiltered to generate a filtered command position signal (FCP). Filtering the accumulated command position signals introduces lag into the U-axis control so that the web is not positioned more quickly than tape head 28 due to lag present in the other axes.

The prefiltering is a software implementation of an infinite impulse response, one pole, low pass digital filter. The filter has a cutoff frequency of 2.651 Hz and a sample period of 0.005 sec. The filter utilizes the following equation:

$$R(n) = \frac{[C(n) + C(n-1) + (23)(R(n-1))]}{25}$$

wherein
R(n)=present filter output
C(n)=present filter input
R(n−1)=last period filter output
C(n−1)=last period filter input After FCP is calculated, the sequence continues to step 312 whereat a following error signal (FE) is calculated as the difference between the newly calculated filtered command position (FCP) and the actual position (ACT POS).

At sequence step 314, #CMD is filtered by the same filtering techniques utilized at step 310 to generate a filtered command signal (FC). At sequence step 316 the filtered command signal (FC) is scaled to produce a command velocity signal (FCV) using a conversion or gain constant ($K_{CI}$) to convert the FC signal to a quantity correlated to inches/minute in view of the mechanics of the machine. At step 318, a commanded acceleration (CMD ACC) signal is calculated which is equal to the difference between the present change in position signal (#CMD) and the previous change in position signal (#CMD$_{-1}$). CMD ACC is filtered and scaled at step 320 by the same filtering technique as utilized at step 310 to generate a filtered commanded acceleration signal (FCA) in inches/second/second. Once the above signals are determined, the sequence proceeds to FIG. 7B (step 322) for generation of the feed reel or primary driving command signals (PCMD) and to FIG. 7C (step 324) for generation of the takeup reel or secondary driving command signals (SCMD) in accordance with the principles of the present invention.

Turning to FIG. 7B, the sequence for generating PCMD begins at step 400 and proceeds to step 402 whereat the static torque component ($T_B$) is calculated, $T_S$ is equal to the product of previously calculated feed reel working radius ($R_F$), the predetermined tension value entered by the operator ($T_K$) and a gain constant $K_{TF}$ selected for the feed reel. The tension value is determined by trial and error to achieve a balance between the friction at the application shoe and tape rigidity at the tape cutters 56.

After $T_S$ is calculated, the sequence branches at step 404 depending upon whether the shoe is on-plane for purposes of properly calculating the dynamic torque component of PCMD. The dynamic torque component for the feed reel ($T_D$) is related to the change in position command signals in one of two ways depending upon whether the shoe is on-plane.

Applicants have determined that when the shoe is on-plane, adequate control of the feed reel is achieved by including components of frictional torque and inertial torque in the dynamic torque calculation. Frictional torque of the feed reel 40 and drive 94 is determined by scaling the commanded angular velocity of spool 40 by an empirically determined coefficient of friction $K_{D1}$. The commanded angular velocity of the feed reel is calculated for the commanded linear velocity of the web (FCV) and the feed reel working radius $R_F$, i.e., angular velocity of web=FCV/$R_F$ Inertial torque of feed reel 40 and drive 94 including the reeled tape is adequately approximated from the moment of inertia of the reeled tape viewed as a cylinder with radius $R_F$, i.e., the inertia is approximated by the product of the angular acceleration of the web, the fourth power of the feed reel working radius ($R_F^4$), the width of the tape (W), and a constant $K_{D3}$, which is empirically determined to account for tape density. Angular acceleration is calculated from th commanded linear acceleration and working radius $R_F$, i.e., angular acceleration=FCA/$R_F$ With the shoe on-plane, the dynamic torque is calculated at process step 406 as the sum of these approximations of frictional torque and inertial torque. In practice, one of these torques may dominate and the calculation at process step 406 would be reduced to the dominant torque component (e.g., frictional torque may dominate on-plane).

Applicants have determined that for the shoe off-plane, the same approximation of frictional torque and inertial torque may be made as for on-plane, provided that the constant scale factors utilized reflect the empirically determined values for off-plane condition. Thus, the constants $K_{D4}$ and $K_{D2}$ replace respectively the constants $K_{D1}$ and $K_{D3}$ in the on-plane formulae. The calculation of dynamic torque when the shoe is off-plane is performed at process step 408 as the sum of these approximations. In practice, one of these torques may dominate when the shoe is off-plane (e.g., inertial torque) in which case the calculation at step 408 would be reduced to the dominant torque component. Also, for off-plane conditions, an integrator component (INT) is updated at step 410 for purposes to be described hereinafter as the sum of the previous INT plus following error FE. At step 412, the dynamic and static torque components are summed to provide a total torque component ($T_F$).

Once the integrator and torque components are calculated, a velocity base signal ($V_B$) is calculated at step 414 as the sum of (1) filtered command velocity, (2)integrator component multiplied by a gain constant ($K_I$) and (3) following error (FE) multiplied by a proportionality constant ($K_P$). With the shoe on-plane, the integrator component is constant for each iteration of FIG. 7B. The velocity base signal is in units of inches/min and is converted by a scale factor ($K_V$) and the feed reel working radius to provide a scaled velocity component signal $V_D$ at step 416. The scale factor $K_V$ converts the system units per minute to a correct number of bits to produce the correct RPM at drive motor 94. The inverse proportional relationship between $V_D$ and $R_F$ is provided to account for the effective change in gear ratio at the feed reel as the working radius thereof changes.

The sequence continues to steps 418 and 420 whereat the sequence branches in certain directions depending upon whether the web is to be moving and the shoe is on-plane. If the web is to be moving, FCV will not be equal to 0, in which event, the sequence proceeds to step 422 wherein the primary driving command signal (PCMD) is calculated as the sum of $V_D$ plus $T_F$ and then output to servo motor 94 at step 424 to move the web. Thereafter, the position loop sequence of FIG. 7B ends as represented by the return at step 426. Similarly, if the web is to be stationary, but the shoe is off-plane, steps 422–426 are conducted as described above. If, however, the shoe is on-plane (step 420) and the web is not to move, only the torque signals are to be employed and the position of the feed reel updated to drive the following error to 0. To this end, the sequence will proceed to step 428 whereat the filtered command position signal (FCP) is reinitialized with the value for ACT POS (thus driving FE to 0). Subsequently, the sequence proceeds to step 430 whereat the primary driving command (PCMD) is set equal to the torque components only. Thereafter, PCMD is output at step 424 as previously described. Now, however, with FCV=0 and the shoe on-plane, the only effect on the feed reel will be to maintain proper tension for accurate positioning and in readiness for any subsequent move of the tape head 28 such as might occur if the U-axis were switched to "torque mode" control.

Reference will now be had to the torque command sequence of FIG. 7C which shows the sequence of generating the secondary driving command signals (SCMD) for the takeup reel in the position mode. The sequence of FIG. 7C begins at step 450 and proceeds to decision step 452 wherein it is determined whether the web is commanded to be moved in a forward direction, i.e., from spool 40 to spool 52 (command velocity FCV is greater than 0).

Applicants have determined that adequate control of spool 52 may be achieved with a dynamic torque signal which includes components of frictional forces between web 44 and shoe 46 (shoe force components $T_{D2}$), and selectively includes components of frictional torque and inertial torque of the takeup reel 52, its drive 92 and the web 44 (spool torque components $T_{D1}$). Specifically, applicants have determined that when the commanded velocity at step 450 is zero or negative and/or the web is either commanded to decelerate or move at a constant velocity at step 456 (no commanded acceleration), adequate control of spool 52 is achieved by setting the spool torque component of the dynamic torque signal equal to zero at process step 454. Conversely, when a forward velocity is commanded and the web is to be accelerating (step 456), processing proceeds to calculation of the spool component of torque ($T_{D1}$) at step 458.

The frictional torque of spool 52, drive 92 and web 44 is determined by scaling the angular velocity of spool 52 by an empirically determined constant $K_{D5}$. The spool inertial torque is determined from the angular acceleration thereof and an assumed constant inertia $K_{AT}$. Angular acceleration is determined from the commanded linear acceleration and working radius of spool 52. Thus:

$$\text{frictional torque} = \frac{FCV}{R_T} \cdot K_{D5}$$

and $$\text{inertial torque} = \frac{FCA}{R_T} \cdot K_{AT}$$

As shown at step 458, the torque values are divided by the takeup reel working radius $R_T$ to produce linear force values utilized in subsequent calculations.

When the shoe is off-plane, acceleration of supply from feed reel 40 could cause web 42/44 to spool off and not pass through pinch roll resolver 58 and across shoe 46. The spool torque component of the dynamic torque signal provides an acceleration dynamic torque to the takeup reel whereby to pull web 44 back into tension and insure movement of web 42/44 through pinch roll resolver 58 while also maintaining appropriate tension within cutters 56.

After either step 454 or 458 is completed, the sequence proceeds to step 460 to calculate the shoe force component ($T_{D2}$) of the takeup reel dynamic torque signal, which represents the frictional force of web 44 passing over face 54 of shoe 46. This component is calculated as a viscous friction by multiplying the commanded velocity of the web (FCV) by a viscous frictional coefficient composed of the product of the width of the web (W), the operator entered static tension on the web ($T_K$) and a scale factor $K_F$. Following calculation of the shoe force component $T_{D2}$, the total dynamic torque signal $T_D$ (which actually represents a force) for the takeup reel drive is calculated at step 462 including the spool torque and shoe force components and the static tension $T_K$. Finally, the secondary drive command signal (SCMD) for the takeup reel is produced at step 464 as the product of the total dynamic torque $T_D$ and takeup reel working radius $R_T$ (to convert the force $T_D$ to a torque), and a gain factor $K_{TT}$. SCMD is output to the takeup reel servo motor 92 at step 466 whereupon the routine of FIG. 7C may terminate at step 468.

In an exemplary mode of operation of machine 10, shoe 46 will be brought on-plane such that tape 42 is conformed against the surface of layup tool 48 with the tip 480 of tape course 482 positioned midstream of shoe 46 along line 60, as can be seen in FIG. 4B. Thereafter, various members of the machine will be caused to move along a desired path and simultaneously, position mode control of the U-axis will be utilized to cause frontal edge 484 of tape course 482 to pass under shoe 46 as head 28 moves along the programmed path. With position mode control according to the present invention, the header will be adhered to the layup tool at the desired location and with little, if any, slippage (i.e., not more than about 0.030 inch slippage). The tail will subsequently be properly placed as well.

Once most of header portion 486 of tape course 482 has passed line 60, there will now be sufficient tape adhered to the layup tool to render position control unnecessary in certain applications. Hence, control of the U-axis may be switched to torque mode until the tail 488 of that course is approached. During torque mode control, the change in position command signals generated by the sequences of FIGS. 6A and 6B are not utilized by the U-axis which now is driven with adaptive tension control, as is known and described with reference to FIG. 8 below. Where torque mode is utilized, however, as tail 488 is neared, control of the U-axis may be switched to position mode control. At this time, shoe 46 may be pivoted away from layup tool 48, wherein tension on spools 40 and 52 will also cause web 44 to move away from layup tool 48. In place of shoe 46, a compaction roller 62 (see FIG. 3) may be rotated into position between web 44 and tape 42 to continue compacting tail 488 of tape strip 482 as web 44 is continued to be moved across the face 54 of shoe 46 until tail 488 is applied. Web 44 will now be in position such that an edge 490 of the next course 492 of tape 42 is under shoe 46 along line 60.

To apply course 492, the web is first backed up to reposition forwardly edge 494 of that course along line 60. Head 28 will also be repositioned for application of course 492. If course 492 is a scrap portion, before next course 496 is to be applied, machine 10 may be programmed to move head 28 to an unused location of layup tool 48 to peel off the scrap course 492 in the same manner as tape is otherwise applied, whereupon tip 498 of course 496 may then be positioned under shoe 46 and head 28 moved back onto the layup tool 48 where desired for subsequent application of tape.

With reference to FIG. 8, adaptive tension control or torque mode will be described. As with the sequence of FIGS. 7A–7C, the sequence of FIG. 8 is initiated every five milliseconds (step 500) and begins with issuance of an interrupt (step 501) to the servo supervisor 124. At process step 502, resolver and tachometer data from feed reel resolver 104, pinch roll resolver 58 and tachometer 96 are read by interfaces 160, 162 and 168, respectively, and at step 504, microprocessor unit 154 calculates the actual position of the web at shoe 46 (ACT POS). At step 506, the working radius of the web on the feed reel and the web on the takeup reel are each calculated as necessary. Steps 500-506 are preferably identical to the corresponding steps 300 to 306 of FIG. 7A.

After the radii are calculated, the sequence proceeds to step 508 whereat the primary and secondary driving command signals are calculated for the respective spools. The command (SCMD) for the takeup reel drive is calculated as the product of the previously described, operator entered, tension signal ($T_K$), the working radius of the takeup reel ($R_T$) and a constant ($K_1$). Similarly, the command (PCMD) for the feed reel drive is calculated as the product of $T_K$, the feed reel working radius ($R_F$), and another constant ($K_2$). At step 510, the respective driving command signals are output to the respective motors and the sequence ends at step 512.

With the present invention, it is preferred that the servo loop be proportional-only when shoe 46 is on-plane. As is understood, typical servo control may include both proportional and integral components related to the following error. Elimination of the integral control renders the U-axis position control springy. This is important because as tape head 28 moves under command of the computer controller, tape will tend to be tugged away from web 44. However, the various components of movement of head 28 may not be precisely equal to the commanded change in position of the web in the U-axis. As a consequence of such mismatch, the servo control would continue to attempt movement of the web 44. However, with web 44 on-plane, excessive movement of web 44 in either direction cannot be forced to occur because the tape is rigidly attached to the layup tool due to compaction of shoe 46. Those attempted movements, therefore, would result in slackening or overtightening of portions of the web.

On the other hand, there are certain practical limits on the amount of mismatch which should be tolerated. Experience has suggested that for machine 10 as preferred and described, there should be 5–10 lbs. of tension on web 42/44 as it passes through cutters 56. This tension is achieved by controlling the gain constants used throughout the servo loop. The gains which go into this aspect of the control are the motor drive gain built into the drive amplifier 102, the constant $K_V$ utilized in generating the scaled velocity component signal $V_D$ and, importantly, the proportionality constant $K_P$ utilized at step 414 of FIG. 7B by which to proportionally relate the primary driving command signal to the following error.

As will also be seen in FIG. 7B, a portion of the primary drive command signal is made up of the filtered command velocity, which comprises a velocity feed forward signal. Addition of the velocity feed forward signal has the advantage that large signals can be applied to drive motor 94 resulting in high speed movements of web 44 while maintaining small following errors. However, because the other axes do not utilize velocity feed forward in the preferred embodiment, the U-axis will tend to approach its commanded position more quickly than tape head 28. Thus, some lag must be introduced into the U-axis control as accomplished by utilization of the filtered command position (FCP) rather than the actual command position signal itself.

The invention has the further advantage that inclusion of velocity feed forward and dynamic torque signals as components of the primary driving command signal tend to drive the following error to 0. Thus, the following error may be expected to be a very small number and reflect only perturbations in the system to which the servo control can readily and promptly react to maintain position control in the U-axis.

When off-plane, the integrator component (INT) is utilized to improve positioning accuracy of the web. This is useful for tape cutting and for laying tape on the layup tool without compaction.

Servo control of the other axes is disclosed in greater detail in pending U.S. patent application Ser. No. 020,820, entitled "Method and Apparatus for Automatic Servo Gain Adjustment for Machine Control", filed Mar. 2, 1987, and assigned to the assignee herein, the disclosure of which is incorporated herein by reference. The procedures there-disclosed may also be employed to compensate for drift in the drive amplifiers and to correct for errors in the preselected gain factor signal of certain of the axes, although it is not preferred for the U-axis. Further, tracking adjust of the gain factors especially related to the A and Z axes may be utilized as described in aforementioned U.S. Pat. No. 4,719,397 which has been incorporated herein by reference.

While the present invention has been illustrated by description of a preferred embodiment and while the preferred embodiment has been described in considerable detail, it is not the intention of the applicants to restrict or in any way limit the scope of the appended claims to such detail. Additional advantages and modifications will readily appear to those skilled in the art.

The invention in its broader aspects is therefore not limited to the specific details, representative apparatus and method, and illustrative example shown and described. Accordingly, departures may be made from such details without departing from the spirit or scope of applicants general inventive concept.

What is claimed is:

1. Apparatus for longitudinally positioning a tape web, comprising:
   a frame;
   means associated with said frame for rotatably supporting first and second spools adapted to contain opposite ends of a tape web;
   an application member connected to said frame between the spools and over which the tape web is to be longitudinally positioned;
   first drive means for applying a torque to the first spool;
   second drive means for applying a torque to the said spool;
   means for generating a position signal indicative of a desired longitudinal movement of the tape web over said application member;
   means for generating a first dynamic torque signal in response to said position signal, said first dynamic signal being correlated to at least one of an inertial torque and a frictional torque of the first spool and said first drive means;
   means for generating a second dynamic torque signal in response to said position signal, said second dynamic torque signal being correlated to at least one of (1) an inertial torque of the second spool and said second drive means, (2) a frictional torque of the second spool and said second drive means, and (3) a frictional force of the tape web being positioned over said application member;
   means for generating a primary driving command signal correlated to at least (1) a following error difference between the desired longitudinal movement and an actual longitudinal movement of the tape web over said application member and (2) said first dynamic torque signal;
   means for generating a secondary driving command signal correlated to at least said second dynamic torque signal;
   means for coupling said primary driving command signal to said first drive means for applying torque to the first spool; and
   means for coupling said secondary driving command signal to said second drive means for applying torque to the second spool whereby to longitudinally position the tape web over said application member.

2. The apparatus of claim 1, said means for generating said first dynamic torque signal including:
   means for low pass filtering said position signal to generate a filtered position signal;
   means for generating a velocity feed forward signal in response to said filtered position signal; and
   means for generating a frictional torque signal in response to said velocity feed forward signal, said frictional torque signal being representative of said frictional torque of the first spool and said first drive means, for generating said first dynamic torque signal.

3. The apparatus of claim 2, said means for generating said first dynamic torque signal further including:
   means for generating an acceleration signal in response to said position signal;
   means for low pass filtering said acceleration signal to generate a filtered acceleration signal; and
   means for generating an inertial torque signal in response to said acceleration signal, said inertial torque signal being representative of said inertial torque of the first spool and said first drive means, for generating said first dynamic torque signal.

4. The apparatus of claim 1, said means for generating said first dynamic torque signal including:
   means for generating an acceleration signal in response to said position signal;
   means for low pass filtering said acceleration signal to generate a filtered acceleration signal; and
   means for generating an inertial torque signal in response to said filtered acceleration signal, said inertial torque signal being representative of said inertial torque of the first spool and said first drive means, for generating said first dynamic torque signal.

5. The apparatus of claim 1, said means for generating said second dynamic torque signal including
   means for low pass filtering said position signal to generate a filtered position signal;
   means for generating a velocity feed forward signal in response to said filtered position signal; and
   means for generating a shoe force signal in response to said velocity feed forward signal, said shoe force signal being representative of said frictional force of the tape web being positioned over said application member, for generating said second dynamic torque signal.

6. The apparatus of claim 5, said means for generating said second dynamic torque further including:
   means for generating an acceleration signal in response to said position signal;
   means for low pass filtering said acceleration signal to generate a filtered acceleration signal; and
   means for generating an inertial torque signal in response to said filtered acceleration signal, said inertial torque signal being representative of said inertial torque of the second spool and said second drive means, for generating said second dynamic torque signal.

7. The apparatus of claim 6, said means for generating said second dynamic torque further including:
   means for low pass filtering said position signal to generate a filtered position signal;
   means for generating a velocity feed forward signal in response to said filtered position signal; and
   means for generating a frictional torque signal in response to said velocity feed forward signal, said frictional torque signal being representative of said frictional torque of the second spool and said second drive means, for generating said second dynamic torque signal.

8. The apparatus of claim 5, said means for generating said second dynamic torque further including:
   means for low pass filtering said position signal to generate a filtered position signal;
   means for generating a velocity feed forward signal in response to said filtered position signal; and
   means for generating a frictional torque signal in response to said velocity feed forward signal, said frictional torque signal being representative of said frictional torque of the second spool and said second drive means, for generating said second dynamic torque signal.

9. The apparatus of claim 1, said means for generating said second dynamic torque including:
  means for generating an acceleration signal in response to said position signal;
  means for low pass filtering said acceleration signal to generate a filtered acceleration signal; and
  means for generating an inertial torque signal in response to said filtered acceleration signal, said inertial torque signal being representative of said inertial torque of the second spool and said second drive means, for generating said second dynamic torque signal.

10. The apparatus of claim 9, said means for generating said second dynamic torque further including:
  means for low pass filtering said position signal to generate a filtered position signal;
  means for generating a velocity feed forward signal in response to said filtered position signal; and
  means for generating a frictional torque signal in response to said velocity feed forward signal, said frictional torque signal being representative of said frictional torque of the second spool and said second drive means, for generating said second dynamic torque signal.

11. The apparatus of claim 1, said means for generating said second dynamic torque including:
  means for low pass filtering said position signal to generate a filtered position signal;
  means for generating a velocity feed forward signal in response to said filtered position signal; and
  means for generating a frictional torque signal in response to said velocity feed forward signal, said frictional torque signal being representative of said frictional torque of the second spool and said second drive means, for generating said second dynamic torque signal.

12. An apparatus for longitudinally positioning a tape web wherein the tape web carries composite tape material which is peelable therefrom for application to a layup tool, the apparatus including:
  a frame;
  means associated with said frame for rotatably supporting first and second spools adapted to contain opposite ends of a tape web;
  an application member connected to said frame between the spools and over which the tape web is to be longitudinally positioned and whereat tape is to be peeled from the tape web and applied to a layup tool such that the tape web between said application member and the second spool is substantially devoid of tape;
  first drive means for applying a torque to the first spool;
  second drive means for applying a torque to the second spool;
  means for generating a position signal indicative of a desired longitudinal movement of the tape web over said application member;
  means for generating a first dynamic torque signal in response to said position signal, said first dynamic signal being correlated to at least one of an inertial torque and a frictional torque of the first spool and said first drive means;
  means for generating a second dynamic torque signal in response to said position signal, said second dynamic torque signal being correlated to at least one of (1) an inertial torque of the second spool and said second drive means, (2) a frictional torque of the second spool and said second drive means, and (3) a frictional force of the tape web being positioned over said application member;
  means for generating a primary driving command signal correlated to at least (1) a following error difference between the desired longitudinal movement and an actual longitudinal movement of the tape web over said application member, and (2) said first dynamic torque signal;
  means for generating a secondary driving command signal correlated to at least said second dynamic torque signal;
  means for moving said application member toward the layup tool so as to conform the tape web thereagainst; and
  means for effectuating movement of said application member generally along the layup tool;
  means for coupling said primary driving command signal to one of said drive means for applying torque to the spool associated with said one drive means; and
  means for coupling said secondary driving command signal to another of said drive means for applying torque to the spool associated with said another drive means whereby to longitudinally position the tape web over said application member.

13. The apparatus of claim 12 wherein said one drive means is said first drive means whereby said primary driving command signal is coupled to said first drive means.

14. The apparatus of claim 13 further comprising:
  means for monitoring longitudinal movement of the tape web mid-stream of the first spool and said application member whereby to determine said actual longitudinal position of the tape web over said application member.

15. A method of longitudinally positioning a tape web over an application member situated between two spools containing opposite ends of the web, comprising:
  generating a position signal indicative of a desired longitudinal movement of the tape web over the application member;
  generating a first dynamic torque signal in response to said position signal, said first dynamic torque signal being correlated to at least one of an inertial torque and a frictional torque of a first of the two spools and a driver therefor;
  generating a second dynamic torque signal in response to said position signal, said second dynamic torque signal being correlated to at least one of (1) an inertial torque of a second of the spools and a driver therefor, (2) a frictional torque of the second spool and driver therefor, and (3) a frictional force of the tape web being positioned over the application member;
  generating a primary driving command signal correlated to at least (1) a following error difference between the desired longitudinal movement and an actual longitudinal movement of the tape web over the application member and (2) said first dynamic torque signal;
  generating a secondary driving command signal correlated to at least said second dynamic torque signal; and
  applying torque to the first spool in response to said primary driving command signal and applying torque to the second spool in response to said secondary driving command signal whereby to longitudinally position the tape web over the application member.

16. The method of claim 15 wherein said first dynamic torque signal is generated by at least:
   low pass filtering said position signal to generate a filtered position signal;
   generating a velocity feed forward signal in response to said filtered position signal; and
   generating a frictional torque signal in response to said velocity feed forward signal, said frictional torque signal being representative of the frictional torque of the first spool and driver therefor, for generating said first dynamic torque signal.

17. The method of claim 16 wherein said first dynamic torque signal is generated by at least further:
   generating an acceleration signal in response to said position signal;
   low pass filtering said acceleration signal to generate a filtered acceleration signal; and
   generating an inertial torque signal in response to said filtered acceleration signal, said inertial torque signal being representative of the inertial force of the first spool and driver therefor, for generating said first dynamic torque signal.

18. The method of claim 15 wherein said first dynamic torque signal is generated by at least:
   generating an acceleration signal in response to said position signal;
   low pass filtering said acceleration signal to generate a filtered acceleration signal; and
   generating an inertial torque signal in response to said filtered acceleration signal, said inertial torque signal being representative of the inertial force of the first spool and driver therefor, for generating said first dynamic torque signal.

19. The method of claim 15 wherein said second dynamic torque signal is generated by at least:
   low pass filtering said position signal to generate a filtered position signal; and
   generating a velocity feed forward signal in response to said filtered position signal; and
   generating a shoe force signal in response to said velocity feed forward signal, said shoe force signal being representative of the frictional force of the tape web being positioned over the application member, for generating said second dynamic torque signal.

20. The method of claim 19 wherein said second dynamic torque signal is generated by at least further:
   generating an acceleration signal in response to said position signal;
   low pass filtering said acceleration signal to generate a filtered acceleration signal; and
   generating an inertial torque signal in response to said filtered acceleration signal, said inertial torque signal being representative of the inertial force of the second spool and driver therefor, for generating said second dynamic torque signal.

21. The method of claim 20 wherein said second dynamic torque signal is generated by at least further:
   low pass filtering said position signal to generate a filtered position signal;
   generating a velocity feed forward signal in response to said filtered position signal; and
   generating a frictional torque signal in response to said velocity feed forward signal, said frictional torque signal being representative of the frictional torque of the second spool and driver therefor, for generating said second dynamic torque signal.

22. The method of claim 19 wherein said second dynamic torque signal is generated by at least further:
   low pass filtering said position signal to generate a filtered position signal;
   generating a velocity feed forward signal in response to said filtered position signal; and
   generating a frictional torque signal in response to said velocity feed forward signal, said frictional torque signal being representative of the frictional torque of the second spool and driver therefor, for generating said second dynamic torque signal.

23. The method of claim 15 wherein said second dynamic torque signal is generated by at least:
   generating an acceleration signal in response to said position signal;
   low pass filtering said acceleration signal to generate a filtered acceleration signal; and
   generating an inertial torque signal in response to said filtered acceleration signal, said inertial torque signal being representative of the inertial force of the second spool and driver therefor, for generating said second dynamic torque signal.

24. The method of claim 23 wherein said second dynamic torque signal is generated by at least further:
   low pass filtering said position signal to generate a filtered position signal;
   generating a velocity feed forward signal in response to said filtered position signal; and
   generating a frictional torque signal in response to said velocity feed forward signal, said frictional torque signal being representative of the frictional torque of the second spool and driver therefor, for generating said second dynamic torque signal.

25. The method of claim 15 wherein said second dynamic torque signal is generated by at least:
   low pass filtering said position signal to generate a filtered position signal;
   generating a velocity feed forward signal in response to said filtered position signal; and
   generating a frictional torque signal in response to said velocity feed forward signal, said frictional torque signal being representative of the frictional torque of the second spool and driver therefor, for generating said second dynamic torque signal.

26. A method of longitudinally positioning a tape web over an application member situated between two spools containing opposite ends of the web wherein the tape web carries composite tape material between a first of the spools and the application member for application of the tape by the application member to a layup tool thereat such that tape is peeled from the web at the application member and the tape web between the application member and the second of the spools is substantially devoid of tape, the method comprising:
   generating a position signal indicative of a desired longitudinal movement of the tape web over the application member;
   generating a first dynamic torque signal in response to said position signal, said first dynamic torque signal being correlated to at least one of an inertial torque and a frictional torque of a first of the two spools and a driver therefor;
   generating a second dynamic torque signal in response to said position signal, said second dynamic torque signal being correlated to at least one of (1)

an inertial torque of a second of the spools and a driver therefor, (2) a frictional torque of the second spool and driver therefor, and (3) a frictional force of the tape web being positioned over the application member;

generating a primary driving command signal correlated to at least (1) a following error difference between the desired longitudinal movement and an actual longitudinal movement of the tape web over the application member, and (2) said first dynamic torque signal;

generating a secondary driving command signal correlated to at least said second dynamic torque signal;

moving the application member toward the layup tool so as to conform the tape web thereagainst; and effectuating movement of the application member generally parallel the layup tool while applying torque to one of the spools in response to said primary driving command signal and applying torque to another of the spools in response to said secondary driving command signal whereby to longitudinally position the tape web over the application member while applying tape to the layup tool.

27. The method of claim 26 wherein the rotating torque applied in response to said primary driving command signal is applied to the first spool.

28. The method of claim 27 further comprising:
monitoring longitudinal movement of the tape web mid-stream of the first spool and the application member whereby to determine said actual longitudinal position of the tape web over the application member.

* * * * *

UNITED STATES PATENT AND TRADEMARK OFFICE
CERTIFICATE OF CORRECTION

PATENT NO. :     4,799,981
DATED      :     January 24, 1989
INVENTOR(S) :    Kirby L. Stone et al It is certified that error appears in the above-identified patent and that said Letters Patent is hereby corrected as shown below:

In Claim 1 at line 19, replace "said" with -- second --.

Signed and Sealed this

Sixteenth Day of May, 1989

*Attest:*

DONALD J. QUIGG

*Attesting Officer*     *Commissioner of Patents and Trademarks*